(12) United States Patent
Lenhart

(10) Patent No.: US 7,726,898 B2
(45) Date of Patent: Jun. 1, 2010

(54) ADJUSTABLE-LENGTH TUBE, IN PARTICULAR FOR POLES

(75) Inventor: Klaus Lenhart, Ohmden (DE)

(73) Assignee: Leki Lenhart GmbH, Kirckheim/Teck (DE)

( * ) Notice: Subject to any disclaimer, the term of this patent is extended or adjusted under 35 U.S.C. 154(b) by 24 days.

(21) Appl. No.: 10/511,294

(22) PCT Filed: Apr. 11, 2003

(86) PCT No.: PCT/EP03/03805

§ 371 (c)(1), (2), (4) Date: Oct. 15, 2004

(87) PCT Pub. No.: WO03/095041

PCT Pub. Date: Nov. 20, 2003

(65) Prior Publication Data

US 2005/0207829 A1    Sep. 22, 2005

(30) Foreign Application Priority Data

May 8, 2002    (DE) .............................. 202 07 554 U

(51) Int. Cl.
*A63C 11/22* (2006.01)
*F16B 7/02* (2006.01)
*F16B 7/10* (2006.01)

(52) U.S. Cl. ..................... 403/109.1; 403/374.3; 135/75

(58) Field of Classification Search .............. 403/109.5, 403/109.1, 297, 374.3, 377; 135/75; 280/823; 411/51, 60.2

See application file for complete search history.

(56) References Cited

U.S. PATENT DOCUMENTS 2,490,369 A * 12/1949 Neuwirth ..................... 403/368

(Continued)

FOREIGN PATENT DOCUMENTS

CH    267177    *   3/1950

(Continued)

OTHER PUBLICATIONS

English Translation of patent DE-8,004,343U1.*

(Continued)

*Primary Examiner*—Daniel P Stodola
*Assistant Examiner*—Ernesto Garcia
(74) *Attorney, Agent, or Firm*—Sughrue Mion, PLLC

(57) ABSTRACT

An adjustable-length tube (10) for sticks, having an outer tube (12) and an inner tube (11) that can be inserted telescope-like into the outer tube (12) for adjusting the length of the tube, and having a spreading device (15) that is supported at the insertion end of the inner tube (11), the spreading device being able to clamp the inner tube (11) axially in the outer tube (12) and having a spreading element (16) that can be radially pressed apart and that is furnished with an inner cone (27), an interior element (17) that is provided with a reverse-oriented outer cone (22) and that is accommodated in the spreading element (16) so as to be axially movable, and an adjusting screw (18) that is axially oriented and is supported in a rotationally fixed manner on the inner tube (11), the adjusting screw having an operational connection to an internally threaded bore (21) in the interior element (17). So that an adjustable-length tube of this type responds to impact-like axial stresses by continuing to clamp rather than sliding or giving way, provision is made that the inner cone (27) of the spreading element (16) is situated such that it opens in the direction of the inner tube (11), and the spreading element (16) is supported between an inner limit stop (28) on the inner tube (11) and an exterior limit stop (26) on the free end of the adjusting screw (18) so as to be axially movable within narrow limits.

8 Claims, 3 Drawing Sheets

U.S. PATENT DOCUMENTS

| | | | |
|---|---|---|---|
| 2,508,039 A | | 5/1950 | Neuwirth |
| 2,533,733 A | * | 12/1950 | Jensen .................. 403/370 |
| 2,542,967 A | * | 2/1951 | Waechter ................ 403/372 |
| 2,695,800 A | | 11/1954 | Soucy |
| 2,947,556 A | * | 8/1960 | Wenger ................. 403/409.1 |
| 2,955,504 A | * | 10/1960 | Lovrinch et al. ............ 411/51 |
| 3,145,669 A | * | 8/1964 | Kupski .................. 108/148 |
| 3,227,113 A | * | 1/1966 | Kupski .................. 108/148 |
| 4,134,703 A | * | 1/1979 | Hinners ................ 403/374.4 |
| 4,238,164 A | | 12/1980 | Mazzolla |
| 4,856,929 A | * | 8/1989 | Smahlik et al. ............ 403/297 |
| 4,858,926 A | * | 8/1989 | Cabianca ................. 403/297 |
| 5,458,427 A | * | 10/1995 | Simond ................. 403/109.5 |
| 5,538,354 A | * | 7/1996 | Simond ................. 403/109.5 |
| 5,651,565 A | * | 7/1997 | Liu |
| 5,803,643 A | * | 9/1998 | Patelli et al. ............. 403/297 |
| 5,897,268 A | | 4/1999 | Deville |
| 6,027,087 A | | 2/2000 | Peterson |
| 6,250,839 B1 | * | 6/2001 | Lenhart ................. 403/109.5 |
| 6,719,331 B1 | * | 4/2004 | Chen ..................... 285/302 |

FOREIGN PATENT DOCUMENTS

| | | | |
|---|---|---|---|
| DE | 1046998 | * | 12/1958 |
| DE | 10 58 889 | | 6/1959 |
| DE | 7701409 U | * | 4/1977 |
| DE | 79 23 826 | | 11/1979 |
| DE | 80 04 343 | | 6/1980 |
| DE | 42 10 488 | | 10/1993 |
| DE | 43 18 482 | | 12/1993 |
| DE | 94 19 707 | | 1/1995 |
| DE | 297 06 849 | | 9/1998 |
| DE | 297 08 829 | | 10/1998 |
| DE | 20301239 U1 | * | 4/2003 |
| DE | 20301239 U1 | * | 5/2003 |
| EP | 145096 A2 | * | 6/1985 |
| FR | 1 197 234 | | 11/1959 |
| FR | 2816515 | * | 5/2002 |
| GB | 320682 | * | 10/1929 |
| JP | 50112424 | | 2/1974 |
| JP | 08128239 A | | 5/1996 |
| JP | 10-28750 A | * | 2/1998 |

OTHER PUBLICATIONS

English Translation of Lenhart, DE-29,706,849U1.*

English Translation of Neuheiten, CH-267,177.*

English Translation of Lenhart, DE-29,706,849U1, Aug. 13, 1998.*

English Translation of Neuheiten, CH-267,177, Mar. 15, 1950.*

English Translation of patent DE-8,004,343U1, Jun. 4, 1980.*

* cited by examiner

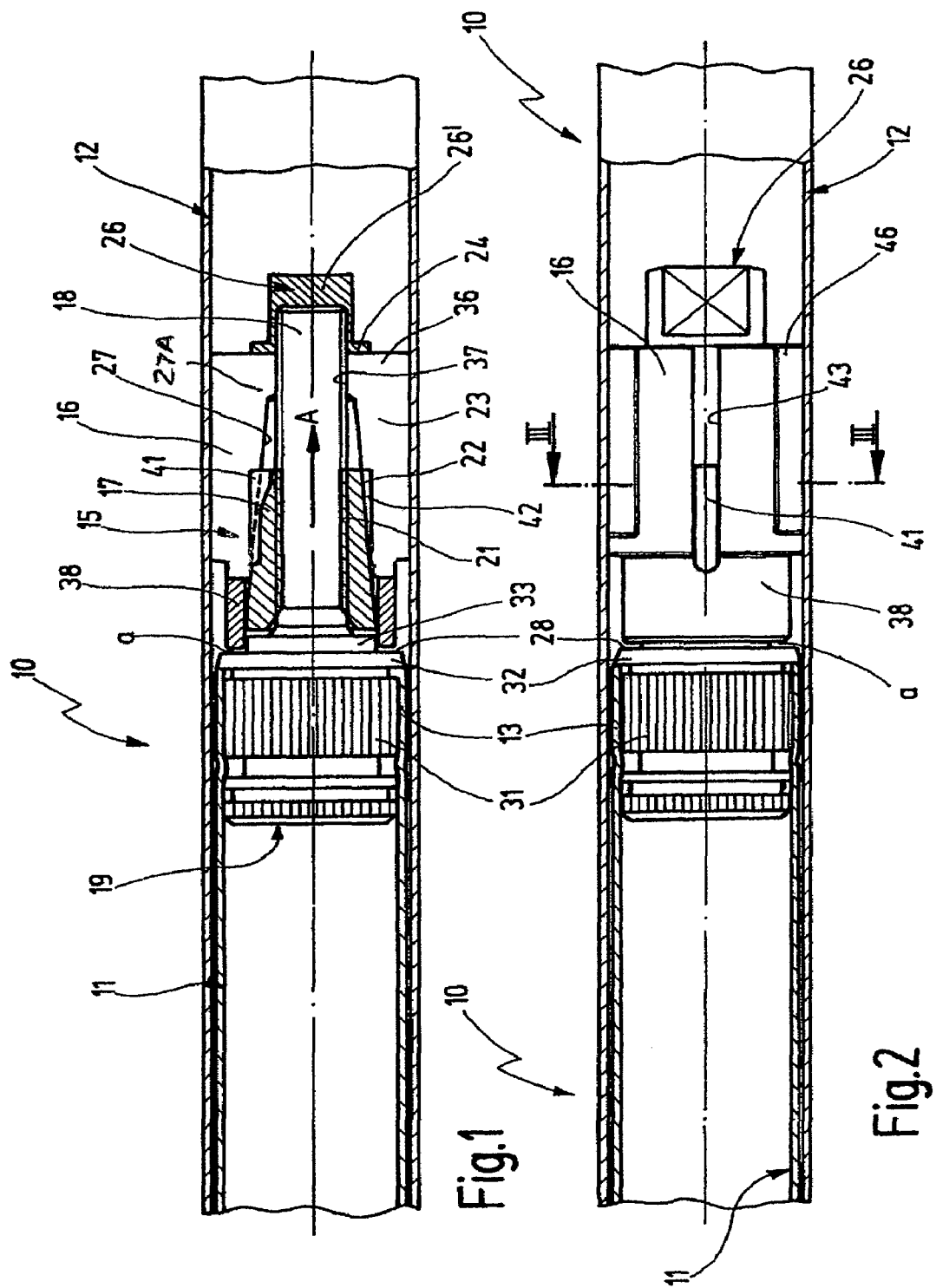

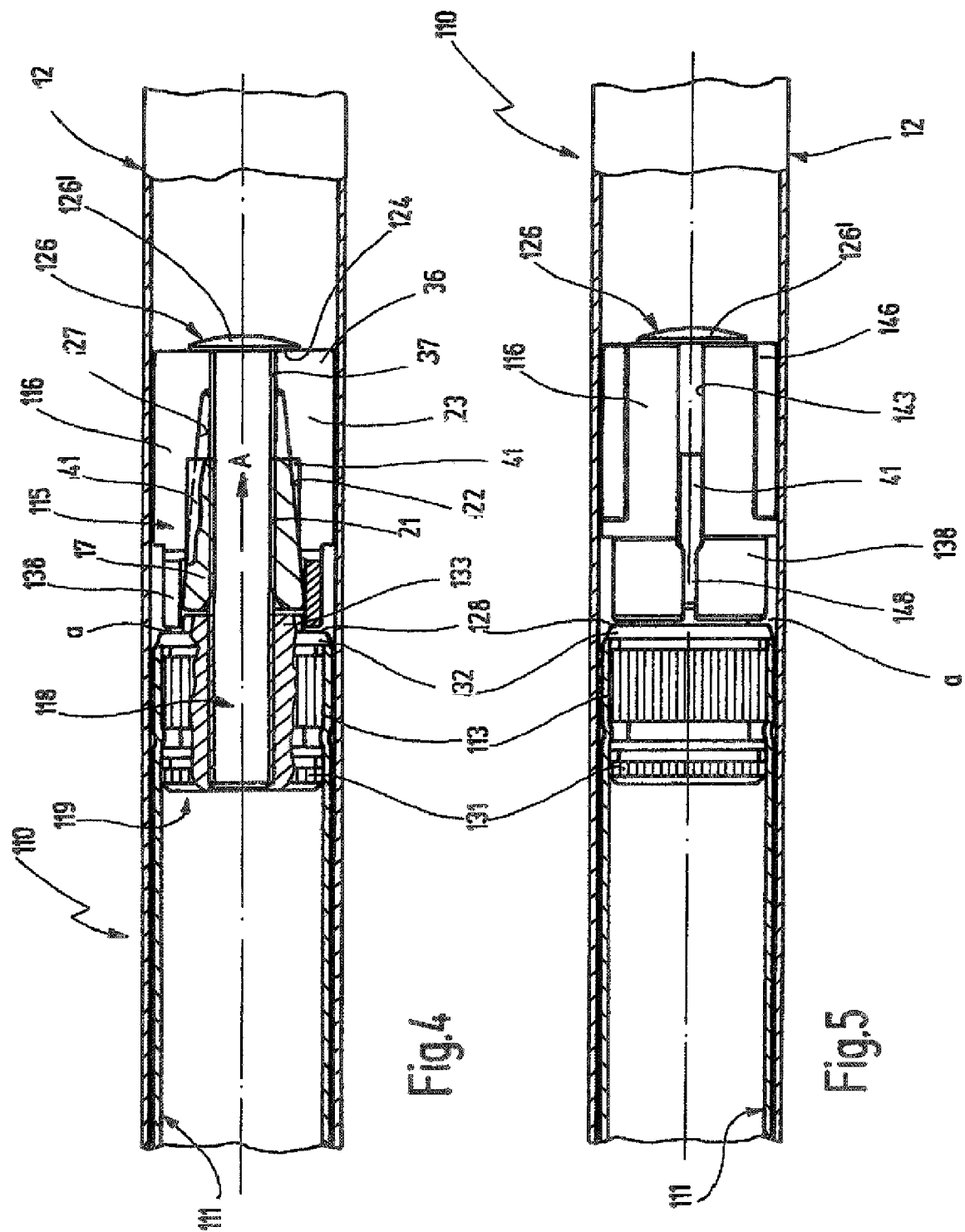

ADJUSTABLE-LENGTH TUBE, IN PARTICULAR FOR POLES

This application is the national stage of PCT/EP03/03805 filed on Apr. 11, 2003 and also claims Paris Convention priority of DE 202 07 54.0 filed on May 8, 2002.

BACKGROUND OF THE INVENTION

The present invention relates to an adjustable-length tube, especially for sticks, in accordance with the independent claim.

In an adjustable-length tube such as is known from DE 297 06 849 U1, the spreading element is provided with a tapering inner cone oriented towards the inner tube, whereas the corresponding interior element that is provided with the outer cone is displaced towards the inner tube by the adjusting screw so that the spreading device can grab hold. In this manner, although the result is a relatively parallel clamping over the entire axial length of the spreading element, nevertheless it has been found that in response to impact-like stresses on the stick tip from the handle-side of an adjustable-length stick, an axial displacement of the outer tube with respect to the inner tube cannot always be avoided and especially not when, in the twisting motion, insufficient force has been applied for purposes of clamping.

Furthermore, from DE 297 08 829 U1, an adjustable-length tube is known, in which the interior element that is provided with the outer cone is formed by the forward free end of the adjusting screw, and the spreading element that is provided with the inner cone is moved axially on the adjusting screw. In this context, although the inner cone of the spreading element is opened towards the inner tube, nevertheless the same aforementioned disadvantages arise here if the spreading element is axially fixed in the spread-apart state. In this case as well, a relative motion between the outer tube and the spreading element can occur.

The objective of the present invention is to create an adjustable-length tube, especially for sticks, of the species cited above, which, in response to impact-like axial stresses, continues to clamp rather than slide or give way.

SUMMARY OF THE INVENTION

The features indicated in the independent claims are put forward to achieve this objective in an adjustable-length tube, especially for sticks, of the aforementioned kind.

As a result of the features according to the present invention, it is achieved that in response to an aforementioned impact-like stress, the holding force between the spreading element, or inner tube, and the outer tube is increased, because as a result of the relative axial movability of the interior element and the spreading element, the former is able to penetrate further into the inner cone of the spreading element. Even in the case of a telescope mechanism that is tightened using too little torque, the result is essentially a further spreading, which in turn reinforces the clamping force in the direction of the stress, so that even in these cases a displacement or a relative motion is prevented In a preferred embodiment of the invention, the spreading element is configured in a pot-like fashion, with a pot base being penetrated by a free end area of said adjusting screw, facing away from said inner tube. In another preferred embodiment, the spreading element comprises a cylindrical shoulder having a smaller exterior diameter and facing said inner tube, with the shoulder being axially guided at one area of said end of said inner tube. In both these embodiments, a jam-free guiding of the spreading element within the given axial movability is provided.

In an advantageous embodiment with regard to the outer limit stop for the spreading element, the outer limit stop is formed by a cap that is axially secured at the free end of the adjusting screw after the spreading element has been set in place. The assembly of the spreading element thereby takes place before attachment of the outer limit stop.

In an alternative embodiment of the invention, the exterior limit stop is formed by a head that is moulded onto the free end of the adjusting screw, and the spreading element has a peripheral slot that extends along an entire axial length thereof. With the stop already provided, the spreading element is configured such that it can be radially placed onto the adjusting screw and the interior element.

In one advantageous embodiment of the inner limit stop, the spreading device has a plug that accommodates the adjusting screw in an axial and rotationally fixed manner, the plug being supported axially and in a rotationally fixed manner in the inner tube and defining the inner limit stop. The plug has an axially protruding guide member cooperating with the cylindrical shoulder of the spreading element.

In an embodiment of the invention, the interior element has one or more radially protruding fins, which are guided in axial slots of the spreading element. A rotationally fixed axial movability of the interior element with respect to the spreading element is thereby achieved.

BRIEF DESCRIPTION OF THE DRAWINGS

Further details of the present invention can be derived from the following description, in which the present invention is described in greater detail and is explained on the basis of the exemplary embodiments depicted in the drawing. In the latter:

FIG. 1 in a partial longitudinal cutaway and truncated view depicts an adjustable-length tube according to a first exemplary embodiment of the present invention, FIG. 2 depicts a partial longitudinal cutaway view, rotated 90. degree. with respect to FIG. 1, of the first exemplary embodiment, FIG. 4 depicts a representation corresponding to FIG. 1, but in accordance with a second exemplary embodiment of the present invention, and FIG. 5 depicts a representation corresponding to FIG. 2, but in accordance with the second exemplary embodiment of the present invention

DESCRIPTION OF THE PREFERRED EMBODIMENT

Figure 3:
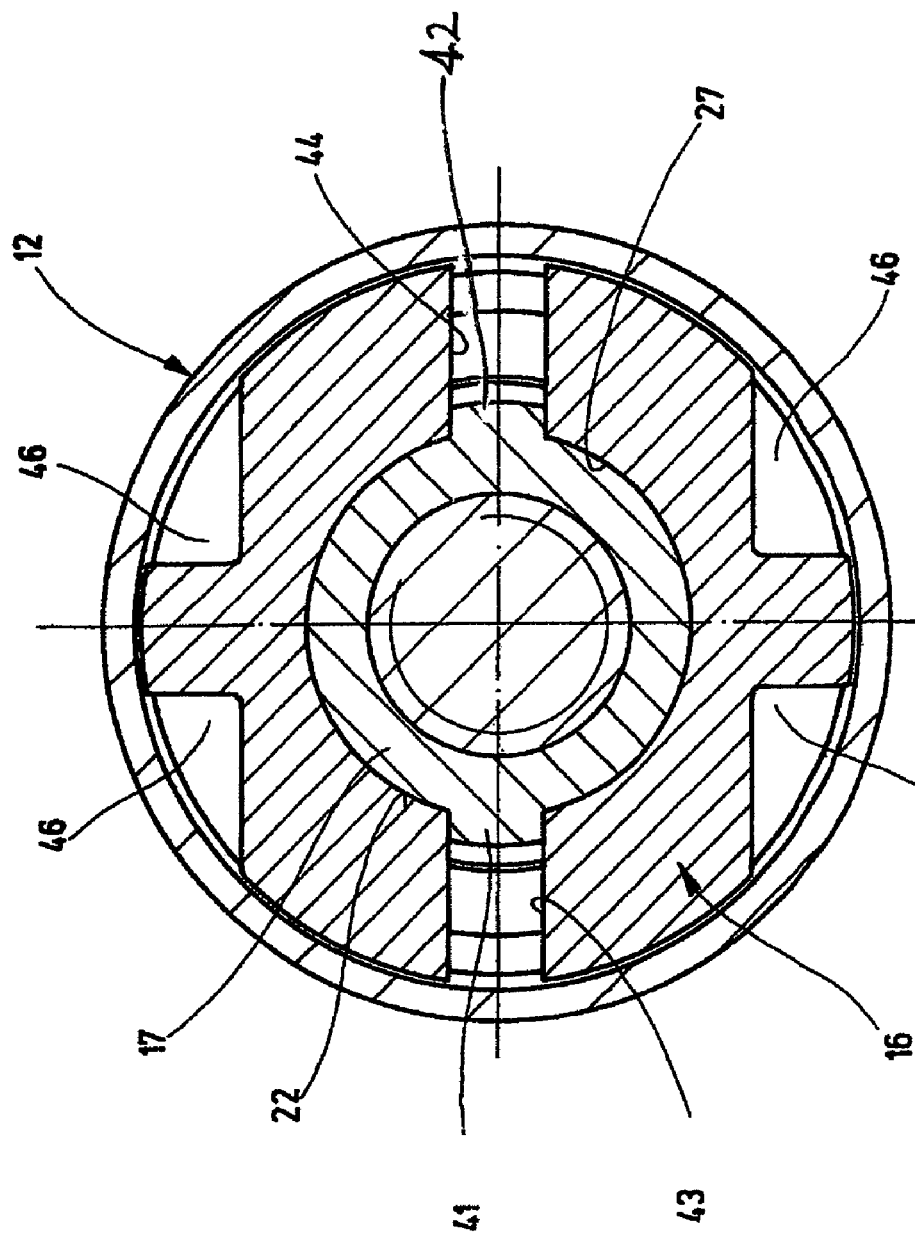
FIG. 3 depicts a view along the line of FIG. 2.

In the connecting segments of an adjustable-length tube 10, 110, depicted in the drawing in accordance with two exemplary embodiments, an inner tube 11 is guided telescope-like in an outer tube 12. For this purpose, inner tube 11, at its end 13 that is facing outer tube 12, is provided with a spreading device 15, 115, using which inner tube 11 can be fixed at any position within the outer tube 12 in a clamping manner.

Spreading device 15, 115 has an exterior element in the form of a spreading element 16, 116, an interior element 17, and an adjusting screw, or externally threaded rod 18, 118. Externally threaded rod 18, 118, which is arranged in the axial direction of tube 10, 110, is supported at its one end area in a rotationally fixed manner on insertion end 13 of inner tube 11. For this purpose, externally threaded rod 18, 118 is inserted, or screwed, into an end plug 19, 119, or is integrally configured on the latter, or the like, and is axially fixed and held in a rotationally fixed manner in the end plug using adhesive or the like. End plug 19, 119 is also axially fixed and supported in a rotationally fixed manner in inner tube 11.

Interior element 17 by its axial central interior thread 21 is screwed onto externally threaded rod 18, 118. Interior element 17 is provided on its exterior side with a cone 22, or it is configured in a conical manner. Outer cone 22 tapers toward the free end of externally threaded rod 18, 118. Externally threaded rod 18, 118 penetrates internally threaded bore 21 of interior element 17 and is connected at its protruding free end in a rotationally fixed manner to an exterior limit stop 26, 126.

Exterior-side spreading element 16, 116 on its spreadable main body 23 has a single cone, or interior taper 27, whose slope corresponds to that of outer cone, or exterior taper 22 of interior element 17. According to the graphic depiction, interior element 17 is accommodated without play in spreading element 16, 116, which is oriented in the contrary direction, outer cone 22 being shorter than inner cone 27. In accordance with the depicted arrangement, inner cone, or interior taper 27 of spreading element 16, 116 opens towards inner tube 11. By way of example, spreading element 16, 116 can be made of plastic, and interior element 17 can be made of metal or plastic.

Integral end plug 19, 119 is provided with an interior part 31, 131, which is supported in inner tube 11 so as to be prevented from rotating or sliding, and a collar 32, which lies on the annular end face of inner tube 11. Protruding from collar 32 is a guide piece 33, 133 for spreading element 16, 116, the guide piece having a smaller diameter than the latter.

Spreading element 16, 116 is roughly pot shaped, pot base 36 having a through bore 37, which is penetrated by the free end area of adjusting screw 18, 118. Pot base 36 is axially movable relative to adjusting screw 18, 118. Main body 23 of spreading element 16, 116, which on the exterior periphery can be provided with one or more friction linings, can be coated therewith, or can be configured through its surface composition (for example, longitudinal ribs) so as to achieve an increased frictional force with respect to the interior periphery of outer tube 12, has, on its end facing away from pot base 36 and facing inner tube 11, a cylindrical shoulder 38, 138, that is smaller in its exterior diameter, in which guide piece 33, 133 can engage at its end side. In this context, between guide piece 33, 133 and spreading element 16, 116, enough play is available, so that the latter can move unhindered both axially and radially. Therefore, spreading element 16, 116 is axially movable within narrow limits between outer limit stop 26, 126 on the free end of adjusting screw 18, 118 and an inner limit stop surface 28, which is formed by the annular surface of collar 32 around guide piece 33, 133. The distance between both limit stop surfaces 24, 124 and 28 is somewhat greater than the axial length of spreading element 16, 116 between the exterior surface of pot base 36 and the annular end face of cylindrical shoulder 38, 138

In the exemplary embodiment of FIGS. 1 through 3, exterior limit stop 26 is formed by a cap 26', which is attached to the free end of adjusting screw 18, for example, by being screwed, pressed, glued, plastic-extruded, or attached in some other way. Cap 26' has a radial edge 24 acting as a limit stop surface 24, which can come into contact with spreading element 16.

In the exemplary embodiment of FIGS. 4 and 5, exterior limit stop 126 is configured as a head 126' that is formed on the free end of adjusting screw 118, interior annular surface 124 of the head constituting the limit stop surface for spreading element 116.

Interior element 17 on each of two diametrically opposite peripheral areas of outer cone 22 has a plurality of fins 41, whose longitudinal end face runs parallel to the stick axis. Each fin 41 is axially guided in a correspondingly wide slot 43, 44, and 143, 144 of spreading element 16, 116. In this manner, when interior element 17 moves axially relative to spreading element 16, 116, it cannot rotate with respect to the latter. Both slots 43, 44, and 143, 144 are provided essentially over the longitudinal extension of main body 23 of spreading element 16, 116, i.e., they only penetrate into the area of cylindrical shoulder 38, 138 to an insignificant extent. In other words, this also means that the greatest radial dimension of diametrically opposite fins 41, is equal to the interior diameter of cylindrical shoulder 38, 138.

As can be seen from FIG. 3, which essentially applies to both exemplary embodiments, spreading element 16, 116 is furnished on its exterior periphery with four notches 46 that are all axially and centrally symmetrical to each other, which run in the longitudinal direction and extend over virtually the entire length of main body 23 of spreading element 16, 116.

Generated in this manner are defined, peripheral clamping areas of spreading element 16, 116. In the exemplary embodiment of FIGS. 1 through 3, after spreading device 16 is fixed in inner tube 11, interior element 17 is screwed onto the free end of adjusting screw 18, and thereafter spreading element 16 is placed over adjusting screw 18. Subsequently, exterior limit stop 26 is attached at the protruding end of adjusting screw 18, after which the end of inner tube 11, which has been completed in this manner, can be inserted into outer tube 12.

In the exemplary embodiment of FIGS. 4 and 5, in which adjusting screw 118 has molded head 126' and in which interior element 17 is screwed from the other side of adjusting screw 118, before adjusting screw 118 has been fixedly joined to end plug 119, spreading element 116 (if it has not been threaded first) must subsequently be placed over adjusting screw 118 and interior element 17. For this purpose, spreading element 116 according to FIG. 5 has an axially continuous slot 148, at which spreading element 116 can be opened radially and placed over interior element 17 and adjusting screw 118. In the depicted exemplary embodiment, continuous slot 148 is partially identical with one of slots 143, 144, although it is narrower in the area that extends further.

In response to the motion of clamping inner tube 11 in outer tube 12 using spreading device 15, 115, interior element 17 is moved away from inner tube 11 in the direction of arrow A by rotating inner tube 11 and therefore adjusting screw 18, 118 to the right (in the case of a left-handed thread) or to the left (in the case of a right-handed thread) with respect to outer tube 12, spreading element 16, 116 first being moved, or pushed, in the same direction up to exterior limit stop 26,126. Thereafter, in response to a further axial motion of interior element 17, spreading element 16, 116 is spread apart radially in the direction of arrow A, so that the exterior circumference of spreading element 16, 116 under pressure contacts the interior circumference of outer tube 12. In this state, the annular end face of cylindrical shoulder 38, 138 of spreading element 16, 116 has a specific, preestablished, slight distance a from inner limit stop surface 28 of collar 32. Then, inner tube 11 being clamped in outer tube 12 using a more or less high torque, if an impact-like axial stress is exerted from outer tube 12, which is provided, for example, with a handle, onto inner tube 11, which is provided with a stick tip, then due to the clamping fixation of spreading element 16, 116 in outer tube 12, interior element 17 can move axially. This means that interior element 17 moves further into interior cone 27 of spreading element 16, 116, which leads to a further spreading of spreading element 16, 116 and therefore to an increase in the holding force between interior tube 11 and outer tube 12.

What is claimed is:

1. An adjustable-length pole, the pole comprising:
   at least one outer tube;
   an inner tube structured and dimensioned for insertion into the outer tube in a telescoping fashion for adjusting a length of the pole;
   a limit stop disposed at an end of the inner tube;
   an adjusting screw being axially oriented within the outer tube, non-rotatable with respect to the inner tube and supported in a fixed manner on the end of the inner tube;
   a limit stop disposed on a free end of the adjusting screw;
   a radially spreadable element with a non-threaded bore and with only one single inner cone, the inner cone opening towards the end of the inner tube, wherein the radially spreadable element is disposed with its axial length between the limit stop disposed at the end of the inner tube and the limit stop disposed on the free end of the adjusting screw, and wherein the distance between the limit stops is larger than the axial length of the radially spreadable element by a gap distance, such that the radially spreadable element is moveable axially within the distance between the limit stops, including the gap distance, without rotation of said element; and
   an interior element having an internal threaded bore and an outer cone tapering towards the free end of the adjusting screw and being structured, dimensioned, and disposed for cooperation with the inner cone of the radially spreadable element, wherein the interior element is screwed onto the adjusting screw and is axially movable with respect to the inner tube by rotation thereof via the internal threaded bore,
   wherein the radially spreadable element and the interior element cooperate to form a spreading device supported axially at the end of the inner tube, the spreading device for clamping the inner tube within the outer tube,
   wherein the inner tube and the spreading device are inserted into the outer tube, and
   wherein the radially spreadable element comprises a cylindrical shoulder having a smaller exterior diameter than a base of the radially spreadable element, and facing the inner tube, said shoulder being axially guidable by a guide piece attached to a limit stop surface at the end of the inner tube facing the radially spreadable element.

2. The pole of claim 1, wherein the pole is a ski or a walking stick.

3. The adjustable-length pole of claim 1, wherein the limit stop disposed on the free end of the adjusting screw is a cap that is axially secured at the free end of the adjusting screw after the radially spreadable element has been set in place.

4. The adjustable-length pole of claim 1, wherein the spreading device has a plug that accommodates the adjusting screw in an axial and rotationally fixed manner, said plug being supported axially and in a rotationally fixed manner in the inner tube and defining the limit stop disposed at an end of the inner tube, said plug having an axially protruding guide member cooperating with said cylindrical shoulder of the radially spreadable element.

5. An adjustable-length pole, the pole comprising:
   at least one outer tube;
   an inner tube structured and dimensioned for insertion into the outer tube in a telescoping fashion for adjusting a length of the pole;
   a limit stop disposed at an end of the inner tube;
   an adjusting screw being axially oriented within the outer tube, non-rotatable with respect to the inner tube and supported in a fixed manner on the end of the inner tube;
   a limit stop disposed on a free end of the adjusting screw;
   a radially spreadable element with a non-threaded bore and with only one single inner cone, the inner cone opening towards the end of the inner tube, wherein the radially spreadable element is disposed with its axial length between the limit stop disposed at the end of the inner tube and the limit stop disposed on the free end of the adjusting screw, and wherein the distance between the limit stops is larger than the axial length of the radially spreadable element by a gap distance, such that the radially spreadable element is moveable axially within the distance between the limit stops, including the gap distance without rotation of said element thereof; and
   an interior element having an internal threaded bore and an outer cone tapering towards the free end of the adjusting screw and being structured, dimensioned, and disposed for cooperation with the inner cone of the radially spreadable element, wherein the interior element is screwed onto the adjusting screw and is axially movable with respect to the inner tube by rotation thereof via the internal threaded bore,
   wherein the radially spreadable element and the interior element cooperate to form a spreading device supported axially at the end of the inner tube, the spreading device for clamping the inner tube within the outer tube,
   wherein said radially spreadable element has a plurality of axial slots and said interior element has a plurality of radially protruding fins, each of said fins being guided in a respective axial slot of the radially spreadable element for axial movement of said fins within said slots, and
   wherein said axial slots have an axial length which is larger than the axial length of said fins and respective pairs of said axial slots and said radially protruding fins structurally cooperate to permit said interior element to move axially as the adjusting screw is rotated with respect to said interior element without rotation of said radially spreadable element,
   wherein at least one of said axial slots extends over most but not all of an entire axial length of said radially spreadable element,
   wherein at least one of said axial slots extend to but not entirely through a shoulder portion of said radially spreadable element that is proximate said inner limit stop, and
   wherein the inner tube and the spreading device are inserted into the outer tube.

6. The adjustable-length pole of claim 5, wherein the limit stop disposed on the free end of the adjusting screw is formed by a head that is molded onto the free end of the adjusting screw, wherein at least one of the axial slots extend along an entire axial length of the radially spreadable element.

7. The adjustable-length pole as recited in claim 5, wherein by a rotation of the inner tube with respect to the outer tube, the spreading device clamps the inner tube to the outer tube, thereby forming an effective adjusted length pole.

8. An adjustable-length pole, the pole comprising:
   at least one outer tube;
   an inner tube structured and dimensioned for insertion into the outer tube in a telescoping fashion for adjusting a length of the pole;
   a limit stop disposed at an end of the inner tube;
   an adjusting screw being axially oriented within the outer tube, non-rotatable with respect to the inner tube and supported in a fixed manner on the end of the inner tube;

a limit stop disposed on a free end of the adjusting screw;

a radially spreadable element with a non-threaded bore and with only one single inner cone, the inner cone opening towards the end of the inner tube, wherein the radially spreadable element is disposed with its axial length between the limit stop disposed at the end of the inner tube and the limit stop disposed on the free end of the adjusting screw, and wherein the distance between the limit stops is larger than the axial length of the radially spreadable element by a gap distance, such that the radially spreadable element is moveable axially within the distance between the limit stops, including the gap distance without rotation of said element thereof; and an interior element having an internal threaded bore and an outer cone tapering towards the free end of the adjusting screw and being structured, dimensioned, and disposed for cooperation with the inner cone of the radially spreadable element, wherein the interior element is screwed onto the adjusting screw and is axially movable with respect to the inner tube by rotation thereof via the internal threaded bore, wherein the radially spreadable element and the interior element cooperate to form a spreading device supported axially at the end of the inner tube, the spreading device for clamping the inner tube within the outer tube, wherein the radially spreadable element is configured as a pot having a base that is penetrated by the free end area of the adjusting screw, facing away from the inner tube, wherein said radially spreadable element has a plurality of axial slots and said interior element has a plurality of radially protruding fins, each of said fins being guided in a respective axial slot of the radially spreadable element, wherein said axial slots have an axial length which is larger than the axial length of said fins and respective pairs of said axial slots and said radially protruding fins structurally cooperate to permit said interior element to move axially as the adjusting screw is rotated with respect to said interior element without rotation of said radially spreadable element, wherein at least one of said axial slots extends over most but not all of an entire axial length of said radially spreadable element, wherein at least one of said axial slots extend to but not entirely through a shoulder portion of said radially spreadable element that is proximate said inner limit stop, and wherein the inner tube and the spreading device are inserted into the outer tube.

\* \* \* \* \*